(12) United States Patent
Hillier et al.

(10) Patent No.: US 11,958,745 B1
(45) Date of Patent: Apr. 16, 2024

(54) USE OF METHANE PYROLYSIS TO DECARBONIZE A HYDROCARBON CRACKING SYSTEM

(71) Applicant: Chevron Phillips Chemical Company LP, The Woodlands, TX (US)

(72) Inventors: James Hillier, Kingwood, TX (US); Michael S. Webster-Gardiner, Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/179,983

(22) Filed: Mar. 7, 2023

(51) Int. Cl.
*C01B 3/24* (2006.01)
*C10G 47/22* (2006.01)

(52) U.S. Cl.
CPC ................ *C01B 3/24* (2013.01); *C10G 47/22* (2013.01); *C01B 2203/0272* (2013.01); *C01B 2203/062* (2013.01); *C01B 2203/1241* (2013.01); *C01B 2203/84* (2013.01); *C01B 2203/86* (2013.01); *C10G 2300/4043* (2013.01); *C10G 2300/4081* (2013.01); *C10G 2300/42* (2013.01); *C10G 2400/20* (2013.01)

(58) Field of Classification Search
CPC ... C01B 3/24; C01B 2203/1241; C10G 47/22; C10G 2300/4043; C10G 2300/4081; C10G 2300/42; C10G 2400/20
USPC .......................................................... 423/650
See application file for complete search history.

(56) References Cited

U.S. PATENT DOCUMENTS

| | | | |
|---|---|---|---|
| 3,156,733 A | 11/1964 | Happel | |
| 4,749,557 A * | 6/1988 | Yetter | ..................... B82Y 30/00 977/773 |
| 6,130,260 A | 10/2000 | Hall | |
| 6,323,247 B1 | 11/2001 | Hall | |
| 6,395,197 B1 | 5/2002 | Detering | |
| 6,602,920 B2 | 8/2003 | Hall | |
| 6,670,058 B2 | 12/2003 | Muradov | |
| 6,869,580 B2 | 3/2005 | Wojtowicz | |
| 7,001,586 B2 | 2/2006 | Wang | |
| 7,097,675 B2 | 8/2006 | Detering | |

(Continued)

FOREIGN PATENT DOCUMENTS

| | | |
|---|---|---|
| EP | 1288182 B1 | 12/2010 |
| WO | 2021078614 A1 | 4/2021 |

OTHER PUBLICATIONS

Nuria Sanchez-Bastardo, et al., "Methane Pyrolysis for Zero-Emission Hydrogen Production: Potential Bridge Technology from Fossil Fuels to a Renewable Sustainable Hydrogen Economy," Ind. Eng. Chem. Res. V. 60, N. 32, pp. 11855-11881.

(Continued)

*Primary Examiner* — Colin W. Slifka
(74) *Attorney, Agent, or Firm* — Scheef & Stone, LLP

(57) ABSTRACT

Processes and systems that utilize methane pyrolysis for carbon capture from a petrochemical stream that contains hydrogen and methane. The petrochemical stream can be the tail gas of a hydrocarbon cracking system, or any other petrochemical stream containing hydrogen and methane. The petrochemical stream can be separated into a hydrogen product stream and a methane product stream, before sending the methane product stream to a methane pyrolysis unit. The methane pyrolysis unit converts methane to solid carbon and hydrogen.

10 Claims, 2 Drawing Sheets

(56) References Cited

U.S. PATENT DOCUMENTS

| | | |
|---|---|---|
| 7,119,240 B2 | 10/2006 | Hall |
| 7,157,167 B1 | 1/2007 | Muradov |
| 7,208,647 B2 | 4/2007 | Peterson |
| 7,931,889 B2 | 4/2011 | Clark |
| 8,002,854 B2 | 8/2011 | Muradov |
| 2002/0041986 A1 | 4/2002 | Wojtowicz |
| 2002/0151604 A1 | 10/2002 | Detering |
| 2005/0003247 A1 | 1/2005 | Pham |
| 2005/0063900 A1 | 3/2005 | Wang |
| 2005/0191531 A1 | 9/2005 | Wojtowicz |
| 2007/0111051 A1* | 5/2007 | Muradov .............. B01J 8/26 422/198 |
| 2010/0123099 A1 | 5/2010 | Clark |
| 2014/0154170 A1 | 6/2014 | Hyde |
| 2020/0002165 A1 | 1/2020 | Desai |
| 2022/0306462 A1 | 9/2022 | Henschel et al. |
| 2022/0387952 A1* | 12/2022 | Groenewald ........ B01J 19/0013 |

OTHER PUBLICATIONS

Marc von Keitz, "Methane Pyrolysis for Hydrogen-Opportunities and Challenges," ARPA-E, Hydrogen Shot Summit, Thermal Conversion with Carbon Capture & Storage, Aug. 31, 2021, 44 pp.

* cited by examiner

USE OF METHANE PYROLYSIS TO DECARBONIZE A HYDROCARBON CRACKING SYSTEM

FIELD OF THE DISCLOSURE

The present disclosure generally relates to the production of olefins in a hydrocarbon cracking system, and more particularly to reducing the carbon footprint of the hydrocarbon cracking system.

BACKGROUND

Furnaces are used in the petrochemical industry as well as other industries to supply heat for a particular application. In the petrochemical industry, an exemplary use of furnaces is in a hydrocarbon cracking system to produce an olefin from an alkane, such as ethylene from ethane. The heat in a furnace can be supplied by the combustion of a fuel gas that can contain hydrocarbons, and combustion of hydrocarbons in the furnace can produce a flue gas that contains carbon dioxide and water.

In an effort to reduce carbon dioxide emissions for these types of furnaces, the flue gas emitted from a furnace can be introduced to a carbon capture process, in which carbon dioxide is removed from the flue gas to produce a carbon dioxide product having a high concentration of carbon dioxide and a residual gas product that has a low concentration of carbon dioxide. The residual gas product can then be used or processed accordingly with reduced concern for carbon dioxide emissions.

There is a need to find other techniques to reduce carbon emissions from hydrocarbon cracking systems.

SUMMARY

Disclosed herein is a process that includes: introducing a hydrogen-rich methane stream or a methane product stream to a methane pyrolysis unit; converting, in the methane pyrolysis unit, methane received from the hydrogen-rich methane stream or from the methane product stream to hydrogen and solid carbon; and introducing a first hydrogen product stream including the hydrogen into i) a furnace of a hydrocarbon cracking system, ii) a hydrogen fired boiler, iii) a hydrogen sales gas pipeline, iv) a storage container, or v) another process.

Also disclosed herein is a hydrocarbon cracking system that can include: a furnace having a conduit contained in an interior of the furnace; a first separator fluidly connected to an outlet of the conduit and configured to separate a first hydrocarbon product stream into a hydrogen-rich hydrocarbon fuel stream and a second hydrocarbon product stream; a second separator fluidly connected to the first separator and configured to separate the hydrogen-rich hydrocarbon fuel stream into a first hydrogen product stream and a methane product stream; and a methane pyrolysis unit having an inlet that is configured to receive the methane product stream, wherein the methane pyrolysis unit is configured to convert methane received from the methane product stream to hydrogen and solid carbon.

Also disclosed herein is a hydrocarbon cracking system that can include: a furnace having a conduit contained in an interior of the furnace; a first separator fluidly connected to an outlet of the conduit and configured to separate a first hydrocarbon product stream into a hydrogen-rich hydrocarbon fuel stream and a second hydrocarbon product stream; and a methane pyrolysis unit having an inlet that is configured to receive the hydrogen-rich hydrocarbon fuel stream, wherein the methane pyrolysis unit is configured to convert methane received from the hydrogen-rich hydrocarbon fuel stream to hydrogen and solid carbon.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
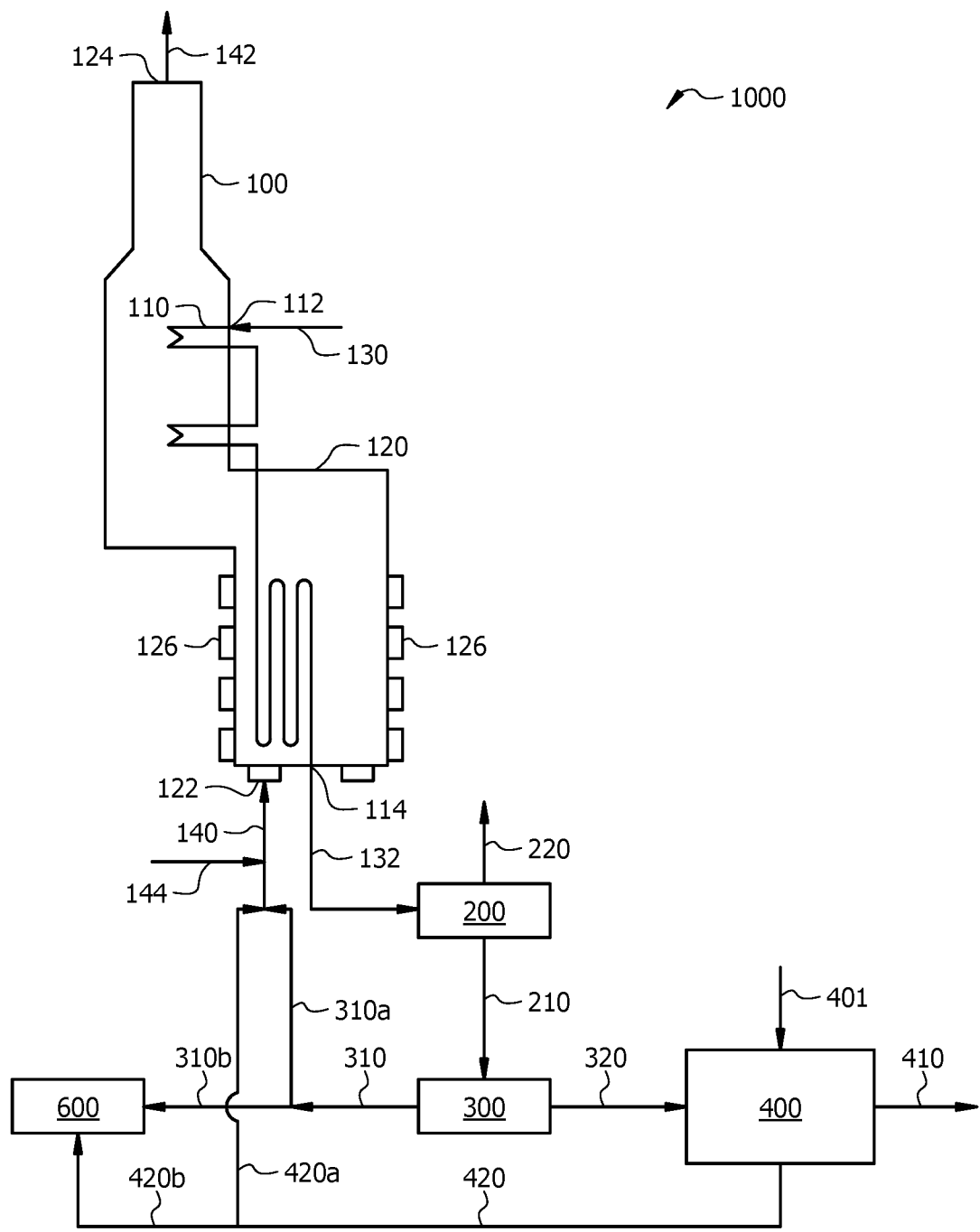
FIG. 1 illustrates a schematic diagram of an embodiment of a hydrocarbon cracking system.

Illustrative aspects of the subject matter claimed herein will now be disclosed. In the interest of clarity, not all features of an actual implementation are described in this specification. It can be appreciated that in the development of any such actual aspect, numerous implementation-specific decisions must be made to achieve the developers' specific goals, such as compliance with system-related and business-related constraints, which can vary from one implementation to another. Moreover, it can be appreciated that such a development effort, even if complex and time-consuming, would be a routine undertaking for those of ordinary skill in the art having the benefit of this disclosure.

As used herein, any recited ranges of values contemplate all values within the range including the end points of the range, and are to be construed as support for claims reciting any sub-ranges having endpoints within the recited range. By way of example, a disclosure in this specification of a range of from 10 to 15 shall be considered to support claims to values of 10, 11, 12, 13, 14, and 15, and to any of the following ranges: 10-11, 10-12, 10-13, 10-14, 10-15, 11-12, 11-13, 11-14, 11-15, 12-13; 12-14, 12-15, 13-14, 13-15, and 14-15.

The term "stream" as used herein refers to a composition of the components disclosed herein for the respective stream. The term "stream" can additionally refer to and imply associated equipment, such as conduit, line, and pipe that is used to move the composition from one location to another (e.g., a stream from one equipment unit to another equipment unit).

The term "conduit" as used herein refers to a tubular structure through which a fluid can flow and having a wall thickness rated for the fluid pressure. A conduit can be embodied as a pipe or tube, for example. Additionally, conduit may refer to a segment of pipe or tubes, or to a series or string of pipes or tubes.

A hydrocarbon cracking system produces a cracking product, and the cracking product can be separated to recover valuable hydrocarbons. In the separation, a tail gas containing hydrogen and methane can be formed, and the tail gas can be fed to the furnace of the hydrocarbon cracking system as fuel. Feeding the tail gas back to the furnace in the cracking system results in combustion of the methane, which converts the methane to carbon dioxide. The carbon dioxide exits from the furnace as part of the flue gas of the furnace. While the flue gas emitted from a furnace can be treated to capture carbon dioxide, it has been found that the presence of hydrogen in the tail gas, when used as at least a portion of the fuel for the furnace of the hydrocarbon cracking system, can reduce the concentration of the carbon dioxide in the flue gas that is treated to capture carbon dioxide. The presence of hydrogen, hydrogen combustion products, and reduced amount of methane in the flue gas presents a challenge for carbon capture techniques that are performed on the flue gas.

The disclosed processes and systems treat the tail gas of the hydrocarbon cracking system to decarbonize the hydrocarbon cracking system. The disclosed processes and systems utilize a methane pyrolysis unit that converts methane recovered from the tail gas to solid carbon and hydrogen. In aspects, the solid carbon can be stored, used in a process, transported by pipeline, or sequestered. In the context of a hydrocarbon cracking system, the disclosed processes and systems shift at least part of the carbon capture away from the flue gas and to the tail gas of the hydrocarbon cracking system. Moreover, the disclosed processes and systems provide aspects of sustainability because the carbon in methane that might otherwise be fed as fuel to a combustion process is captured as solid carbon.

The following description refers to treatment of a hydrogen-rich methane stream, which in some aspects, can be embodied as the tail gas of a hydrocarbon cracking system. It should be understood that the disclosed processes and systems can be applied to any petrochemical stream containing methane and hydrogen.

FIG. 1 is a schematic diagram of an embodiment of a hydrocarbon cracking system 1000. The system 1000 includes a furnace 100, a first separator 200, a second separator 300, and a methane pyrolysis unit 400. In some aspects, the system 1000 can additionally include a unit 600.

The furnace 100 can be fired with methane or hydrogen. The furnace 100 includes conduit 110 that passes hydrocarbon feed components through the interior of the furnace 100 at temperature sufficient to convert an alkane to an olefin (e.g., ethane to ethylene, propane to propylene, or both). The conduit 110 can be configured to pass through a furnace housing 120 of the furnace 100 where a fuel gas is combusted in the presence of oxygen to produce heat for cracking of the hydrocarbons in the conduit 110. The furnace 100 has a first inlet 112 for the conduit 110 that is connected to a hydrocarbon feed stream 130. The furnace 100 has a first outlet 114 for the conduit 110 that is connected to a first cracking product stream 132. The furnace 100 has a fuel inlet 122 fluidly coupled to a fuel gas stream 140. The furnace 100 has a flue gas outlet 124 fluidly coupled to a flue gas stream 142. The furnace housing 120 of the furnace 100 has burners 126 configured to provide flames for combustion of fuel gas that is received from the fuel gas stream 140. In aspects, the burners 126 are configured with metallurgy for hydrocarbon-based combustion in the furnace housing 120. The fuel gas stream 140 contains air supplied from air stream 144 and fuel (e.g., methane for a methane fuel fired furnace or hydrogen for a hydrogen fired furnace).

The hydrocarbon feed stream 130 can include any hydrocarbon or combination of hydrocarbons. For example, the hydrocarbon feed stream 130 can include ethane, propane, butane, or combinations thereof. The hydrocarbon(s) can be received from a hydrocarbon source, such as a pipeline or storage tank.

The first cracking product stream 132 can include methane, hydrogen, cracking products (e.g., ethylene, propylene, butadiene, benzene, or combinations thereof), and uncracked feed hydrocarbons (e.g., ethane, propane, butane, or combinations thereof). In aspects, the first cracking product stream 132 can include methane, hydrogen, uncracked feed hydrocarbon(s), and cracking products.

In aspects where the furnace 100 is a methane fuel fired furnace, the fuel gas stream 140 can include gaseous components resulting from the combination of air stream 144 and a source of methane, such as a natural gas pipeline or at least a portion of methane product stream 320 that is produced as described below. For example, the fuel gas stream 140 can include oxygen, nitrogen, and methane.

In aspects where the furnace 100 is a methane fuel fired furnace, the flue gas stream 142 can include carbon dioxide, nitrogen, water vapor, uncombusted oxygen, or combinations thereof. "Uncombusted oxygen" refers to oxygen that is fed in fuel gas stream 140 to the furnace 100 and passes unreacted to the flue gas in flue gas stream 142. In aspects, the flue gas stream 142 can include primarily carbon dioxide, nitrogen, and water vapor; alternatively, greater than 50, 60, 70, 80, or 90 vol % carbon dioxide, nitrogen, and water vapor, based on a total volume of the flue gas stream 142. The flue gas stream 142 can have carbon dioxide present in an amount ranging from about 10 vol % to about 30 vol % based on a total volume of the flue gas stream 142. In further aspects, the flue gas stream 142 can be fed to a carbon capture process (e.g., such as an absorber having an amine-based acid gas sorbent such as monoethanolamine therein, where the absorber is connected to an absorbent regeneration loop).

In aspects where the furnace 100 is a hydrogen fired furnace, the fuel gas stream 140 can include gaseous components resulting from the combination of air stream 144 and hydrogen from a hydrogen source (e.g., hydrogen product stream 310, hydrogen storage tank, hydrogen process stream from another process, pipeline). For example, the fuel gas stream 140 can include oxygen, nitrogen, and hydrogen. In aspects, the fuel gas stream 140 can additionally contain small amounts of methane as described for the hydrogen product stream 310 herein. The concentration of hydrogen in the fuel gas stream 140 is greater than the concentration of methane in the fuel gas stream 140. For example, a volume ratio of hydrogen:methane in the fuel gas stream 140 can range from about 7:1 to about 1,000:1.

In aspects where the furnace 100 is a hydrogen fired furnace, the flue gas stream 142 stream emitted from the furnace 100 can be referred to herein as a hydrogen combustion product stream. In these aspects, the flue gas stream 142 can include water vapor, nitrogen, and uncombusted oxygen. "Uncombusted oxygen" refers to oxygen that is fed in fuel gas stream 140 to the furnace 100 and passes unreacted to the flue gas stream 142. In aspects, the flue gas stream 142 is free of carbon dioxide. "Free of carbon dioxide" can include less than 1, 0.9, 0.8, 0.7, 0.6, 0.5, 0.4, 0.3, 0.2, or 0.1 vol % carbon dioxide based on a total volume of the flue gas stream 142. In some aspects, the flue gas stream 142 can be fed to a carbon capture process (e.g., such as an absorber having an amine-based acid gas sorbent such as monoethanolamine therein, where the absorber is connected to an absorbent regeneration loop).

The hydrocarbon cracking system 1000 can additionally include a separator 200. The separator 200 can be fluidly connected to and configured to receive the first cracking product stream 132. The separator 200 is configured to separate stream 132 into a hydrogen-rich methane stream 210 and a second cracking product stream 220 (which can be embodied as a plurality of cracking product streams). The separator 200 can be embodied as a distillation column in a demethanizer system, configured to remove methane and lighter molecules (e.g., hydrogen) from ethylene and heavier molecules. The hydrocarbon cracking system 1000 can include other equipment to facilitate recovery of one or more cracking product streams, such as a quench tower, a caustic tower, dryers, compression stage, a deethanizer system, a depropanizer system, a cold box, heat exchangers, or combinations thereof.

The hydrogen-rich methane stream 210 can include hydrogen, methane, and other hydrocarbons (e.g., uncracked feed components such as ethane, propane, butane, or combinations thereof; cracking products such as ethylene, propylene, butene, butadiene, benzene, or combinations thereof). In aspects, the hydrogen-rich methane stream 210 can include hydrogen in a range of from about 40 vol % to less than 100 vol %; alternatively, in a range of from about 40 vol % to about 90 vol %; alternatively, in a range of from about 90 vol % to less than 100 vol % based on a total volume of the hydrogen-rich methane stream 210. In additional aspects, the hydrogen-rich methane stream 210 can include methane in a range of from about 10 vol % to about 85 vol % based on a total volume of the hydrogen-rich methane stream 210. In aspects, the hydrogen-rich methane stream 210 is free of nitrogen, containing 0 vol % nitrogen or less than 1, 0.1, 0.01, 0.001 vol % nitrogen based on a total volume of the hydrogen-rich methane stream 210.

The second cracking product stream 220 can include cracking products (e.g., ethylene, propylene, butadiene, benzene, or combinations thereof), uncracked feed hydrocarbons (e.g., ethane, propane, butane, or combinations thereof), or combinations thereof, that are separated in the separator 200. In alternative aspects, the second cracking product stream 220 includes multiple cracking product streams, e.g., a stream comprising ethylene, a stream comprising propylene, a stream comprising butadiene, a stream comprising benzene, multiple other streams comprising uncracked feed hydrocarbons, or combinations thereof.

The hydrocarbon cracking system 1000 can additionally include a separator 300. The separator 300 is fluidly connected to and configured to receive the hydrogen-rich methane stream 210. The separator 300 is configured to separate the hydrogen-rich methane stream 210 into a methane product stream 320 containing methane and a hydrogen product stream 310 containing hydrogen. The separator 300 can be embodied as vessels and equipment configured to separate methane from hydrogen by pressure swing absorption, membrane separation, cryogenic separations (e.g., cryogenic distillation columns), or combinations thereof.

The hydrogen product stream 310 can include hydrogen in a range of from about 88 vol % to about 100 vol %; alternatively, from about 90 vol % to about 99.9 vol %; alternatively, from about 95 vol % to about 99.9 vol %, based on a total volume of the hydrogen product stream 310. In some aspects, the hydrogen product stream 310 is not pure hydrogen, e.g., does not contain 100 vol % hydrogen. In these aspects, the hydrogen product stream 310 can contain methane in a range of from about 0.1 vol % to about 12 vol %; alternatively, from about 0.1 vol % to about 10 vol %; alternatively, from about 0.1 to about 5 vol %, based on a total volume of the hydrogen product stream 310.

In aspects, the hydrogen product stream 310 can be fluidly connected to the fuel gas stream 140, to a unit 600, or to both. That is, the hydrogen product stream 310 can flow hydrogen from the separator 300 to the furnace 100, to the unit 600, or to both the furnace 100 (e.g., via first portion 310a of the hydrogen product stream 310) and the unit 600 (e.g., via second portion 310b of the hydrogen product stream 310). The unit 600 is described in more detail herein. In aspects where flow of the hydrogen product stream 310 is split into the first portion 310a and the second portion 310b, the flow rate through the first portion 310a can be the same as or different than the flow rate through the second portion 310b. For example, a ratio of flow in the first portion 310a to the flow in second portion 310b can be in a range of 1:1,000 to 1,000:1. In some aspects, the flow in first portion 310a can be zero while all flow of the hydrogen product stream 310 is directed to the second portion 310b; alternatively, the flow in the second portion 310b can be zero while all flow of the hydrogen product stream 310 is directed to the first portion 310a. Generally, the composition of first portion 310a is the same as the composition of the hydrogen product stream 310, and the composition of the second portion 310b is the same as the composition of the hydrogen product stream 310.

The methane product stream 320 can be fluidly connected to the methane pyrolysis unit 400 such that the methane in methane product stream 320 feeds to the methane pyrolysis unit 400. The methane product stream 320 can include methane in a range of from about 60 vol % to about 100 vol % based on a total volume of the methane product stream 320. In aspects, the methane product stream 320 can include hydrogen in a range of from 0 vol % to about 40 vol % based on a total volume of the methane product stream 320. In aspects, the methane product stream 320 is free of nitrogen, containing 0 vol % nitrogen or less than 1, 0.1, 0.01, 0.001 vol % nitrogen based on a total volume of the methane product stream 320.

The hydrocarbon cracking system 1000 can additionally include a methane pyrolysis unit 400. The overall reaction in the methane pyrolysis unit 400 is as follows:

$$CH_4(g) \rightarrow C(s) + 4H_2(g).$$

As can be seen, methane gas is converted under pyrolysis conditions to solid carbon and hydrogen gas. Hydrogen that is received into the methane pyrolysis unit 400 can pass through the unit 400 with the additional hydrogen that is produced via pyrolysis reaction.

The methane pyrolysis unit 400 can be embodied as vessels and equipment configured for any technique of methane pyrolysis, including thermal cracking, thermocatalytic conversion, plasma-based pyrolysis, liquid metal, or combinations thereof. The vessels and equipment can be embodied as a bubble column, capillary reactor, packed bed reactor, fluidized bed reactor, falling film reactor, or combinations thereof. In aspects, the methane pyrolysis unit 400 can have a power source 401 configured to supply energy (e.g., electricity, combustible material) to heat the reaction zone of the reactor where methane pyrolysis takes place.

The methane pyrolysis unit 400 can include a catalyst. The catalyst can contain a metal such as nickel, iron, molybdenum, cobalt, or combinations thereof. In aspects, the catalyst can be contained in a fixed bed or can be fluidized in a fluidized bed. In some aspects, the catalyst can be in a solid phase; alternatively, the catalyst can be in a liquid phase.

In aspects, the methane pyrolysis unit 400 can be operated at a temperature in a range of from about 700° C. to about 1400° C. In aspects for catalyzed methane pyrolysis, the temperature can be in a range of from about 700° C. to about 1100° C. In aspects for methane pyrolysis conducted without a catalyst, the temperature can be in a range of from about 1100° C. to about 1400° C.

In aspects, the reaction zone of the methane pyrolysis unit 400 can have a pressure in a range of from about 0.3 MPa to about 2.5 MPa.

In aspects, the methane pyrolysis unit 400 is operated such that a conversion of methane to hydrogen is in a range of from about 90% to about 100%, based on the amount of methane that is converted to hydrogen on a volume basis.

The solid carbon that is generated in the methane pyrolysis unit 400 can fall to the bottom of the reactor due to gravity. For solid phase catalyst embodiments, the solid carbon can be collected at the bottom of the reactor, and flow from the reactor via a solids outlet on the bottom of the reactor, and into the solid carbon stream 410. For liquid phase catalyst embodiments, the solid carbon can fall to the surface of a pool of liquid catalyst at the bottom of the reactor, and float on the surface of the liquid catalyst. In these aspects, the reactor of the methane pyrolysis unit 400 can include a solids removal device such as an auger to move the solid carbon to a solids outlet on the side of the reactor, and into the solid carbon stream 410.

The solid carbon can be recovered from the methane pyrolysis unit 400 in the solid carbon stream 410. The solid carbon can be embodied as carbon black, amorphous carbon, or carbon nanoparticles, for example. The solid carbon stream 410 can be stored, used in a process, transported by pipeline, or sequestered. The solid carbon can be used or further processed for use as carbon black or a graphite substitute for batteries, in the aluminum industry, in the steel industry, in the construction industry, or combinations thereof. In aspects, the concentration of solid carbon in the solid carbon stream 410 can be from about 90 to 100 wt %; alternatively, from about 95 wt % to about 100 wt % solid carbon based on a total weight of the solid carbon stream 410; alternatively, 90, 91, 92, 93, 94, 95, 96, 97, 98, 99, or 100 wt % based on a total weight of the solid carbon stream 410.

The hydrogen product stream 420 can contain hydrogen in a gas phase. The concentration of hydrogen in the hydrogen product stream 420 can be from about 90 to 100 vol %; alternatively, from about 95 vol % to about 100 vol % based on a total weight of the hydrogen product stream 420; alternatively, 90, 91, 92, 93, 94, 95, 96, 97, 98, 99, or 100 vol % based on a total weight of the hydrogen product stream 420.

In some aspects, a portion of the solid carbon that is generated in the methane pyrolysis unit 400 can be carried in hydrogen gas to the gas outlet of the reactor of the methane pyrolysis unit 400. In such aspects, a filter can be placed in the hydrogen product stream 420 to remove solid carbon that is carried in the gas from the reactor of the methane pyrolysis unit 400.

As can be seen in FIG. 1, the hydrogen product stream 420 can flow hydrogen from the methane pyrolysis unit 400 to the furnace 100, to the unit 600, or to both the furnace 100 (e.g., via first portion 420a of the hydrogen product stream 420) and the unit 600 (e.g., via second portion 420b of the hydrogen product stream 420). The unit 600 is described in more detail herein. In aspects where flow of the hydrogen product stream 420 is split into the first portion 420a and the second portion 420b, the flow rate through the first portion 420a can be the same as or different than the flow rate through the second portion 420b. For example, a ratio of flow in the first portion 420a to the flow second portion 420b can be in a range of 1:1,000 to 1,000:1. In some aspects, the flow in the first portion 420a can be zero while all flow of the hydrogen product stream 420 is directed to the second portion 420b; alternatively, the flow in the second portion 420b can be zero while all flow of the hydrogen product stream 420 is directed to the first portion 420a. Generally, the composition of first portion 420a is the same as the composition of the hydrogen product stream 420, and the composition of the second portion 420b is the same as the composition of the hydrogen product stream 420.

In some aspects, the hydrogen product stream 420 or the first portion 420a of the hydrogen product stream 420 can connect with the fuel gas stream 140; alternatively, the hydrogen product stream 420 or the first portion 420a of the hydrogen product stream 420 can connect with the hydrogen product stream 310 or the first portion 310a prior to being introduced to the fuel gas stream 140. Alternatively, the hydrogen product stream 310 or the first portion 310a can connect with the hydrogen product stream 420 or the first portion 420a prior to being introduced to the fuel gas stream 140.

The unit 600 can be configured to fluidly couple with and to receive the hydrogen product stream 420, or a portion 420b of the hydrogen product stream 420. The unit 600 can include i) a hydrogen fired furnace, ii) a hydrogen fired boiler, iii) a hydrogen sales gas pipeline, iv) a storage container, v) another process, or vi) combinations thereof.

A process performed with system 1000 can include introducing a methane product stream 320 to a methane pyrolysis unit 400; converting, in the methane pyrolysis unit 400, methane received from methane product stream 320 to hydrogen and solid carbon; and introducing a first hydrogen product stream 420 comprising the hydrogen into i) the furnace 100 of the hydrocarbon cracking system 1000, ii) a furnace of another hydrocarbon cracking system, iii) a hydrogen fired boiler, iv) a hydrogen sales gas pipeline, v) a storage container, or vi) another process. In aspects where the first hydrogen product stream 420 (or a portion 420a of the hydrogen product stream 420) is introduced to the furnace 100 of the hydrocarbon cracking system 1000, the process can include cracking a hydrocarbon in the hydrocarbon cracking system 1000 to produce a first cracking product stream 132 by combusting the first hydrogen product stream 420 (or a portion 420a of the hydrogen product stream 420) in the furnace 100 of the hydrocarbon cracking system 1000. In aspects, the process can further include separating a hydrogen-rich methane stream 210 into a second hydrogen product stream 310 and the methane product stream 320. In aspects, the process can include introducing the second hydrogen product stream 310 into i) the furnace 100 of the hydrocarbon cracking system 1000, ii) a hydrogen fired boiler, iii) a hydrogen sales gas pipeline, iv) a storage container, or v) another process. In aspects where the hydrogen product stream 310 is introduced to the furnace 100 of the hydrocarbon cracking system 1000, the process can further include separating a first cracking product stream 132 into a second cracking product stream 220 and the hydrogen-rich methane stream 210; and cracking a hydrocarbon in the hydrocarbon cracking system 1000 to produce the first cracking product stream 132 by combusting the second hydrogen product stream 310 (or a portion 310a of the hydrogen product stream 310) in the furnace 100 of the hydrocarbon cracking system 1000. In aspects, the process can include recovering a solid carbon stream 410 comprising solid carbon from the methane pyrolysis unit 400.

In the process, the hydrocarbon cracking system 1000 can have any of the features and aspects disclosed herein, including but not limited to: i) the furnace 100 can be a hydrogen fired furnace, ii) hydrogen can be present in the first hydrogen product stream 420 in a range from about 50 vol % to about 100 vol % based on a total volume of the first hydrogen product stream 420, iii) hydrogen can be present in the second hydrogen product stream 310 in a range from about 99 vol % to about 100 vol % based on a total volume of the second hydrogen product stream 310, or iv) combinations thereof.

Figure 2:
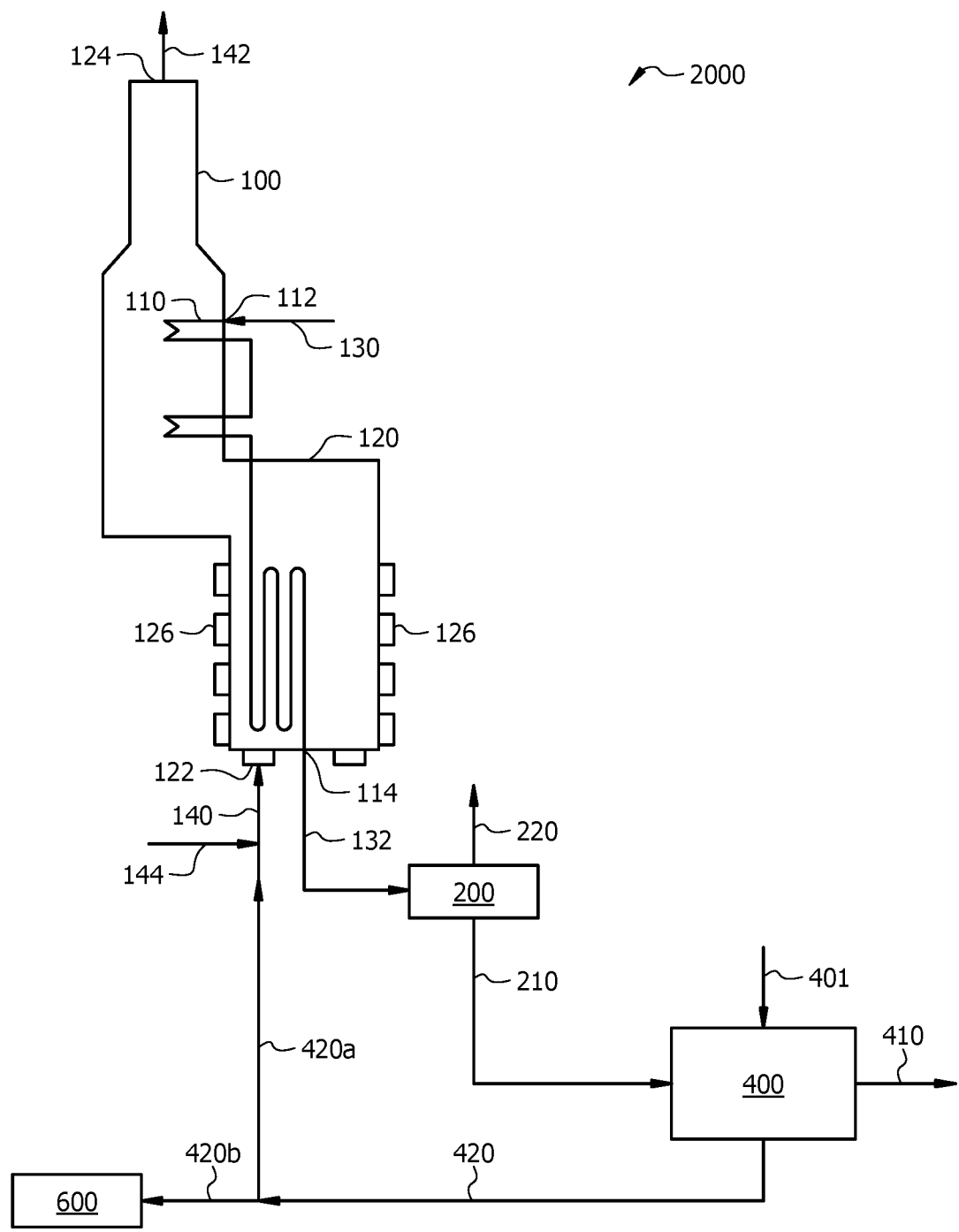
FIG. 2 illustrates a schematic diagram of another embodiment of the hydrocarbon cracking system.

FIG. 2 is a schematic diagram of an embodiment of a hydrocarbon cracking system 2000. The system 2000 includes a furnace 100, a first separator 200, and a methane pyrolysis unit 400. In aspects, the system 2000 can also include the unit 600. Different than system 1000, the system 2000 does not include a second separator 300; thus, the hydrogen-rich methane stream 210 feeds directly to the methane pyrolysis unit 400 in the system 2000.

The furnace 100 in system 2000 is the same as described for the system 1000 in FIG. 1, except as described herein. In aspects where the furnace 100 is a hydrogen fired furnace, the hydrogen source for hydrogen that is in the fuel gas stream 140 does not include the hydrogen product stream 310, since system 2000 does not include separator 300. In system 2000, the fuel gas stream 140 can include gaseous components resulting from the combination of air stream 144 and hydrogen from a hydrogen source (e.g., hydrogen storage tank, hydrogen process stream from another process, a pipeline, first hydrogen product stream 420, portion 420a of the hydrogen product stream 420). In aspects where the furnace 100 is a methane fuel fired furnace, the fuel gas stream 140 can include gaseous components resulting from the combination of air stream 144 and a source of methane, such as a natural gas pipeline or a portion of the hydrogen-rich methane stream 210. For example, the fuel gas stream 140 can include oxygen, nitrogen, and methane.

The separator 200 in system 2000 is the same as described for the separator 200 in system 1000. In the system 2000, the hydrogen-rich methane stream 210 that flows from the separator 200 is configured to fluidly connect with the inlet of the methane pyrolysis unit 400. In the methane pyrolysis unit 400, methane that is received from the hydrogen-rich methane stream 210 is converted to solid carbon and hydrogen. Operation and configurations of the methane pyrolysis unit 400 in FIG. 2 are described above for the methane pyrolysis unit 400 in FIG. 1.

The solid carbon can be recovered from the methane pyrolysis unit 400 in the solid carbon stream 410. The solid carbon can be embodied as carbon black, amorphous carbon, or carbon nanoparticles, for example. The solid carbon stream 410 can be stored, used in a process, transported by pipeline, or sequestered. The solid carbon can be used or further processed for use as carbon black or a graphite substitute for batteries, in the aluminum industry, in the steel industry, in the construction industry, or combinations thereof. In aspects, the concentration of solid carbon in the solid carbon stream 410 can be from about 90 to 100 wt %; alternatively, from about 95 wt % to about 100 wt % solid carbon based on a total weight of the solid carbon stream 410; alternatively, 90, 91, 92, 93, 94, 95, 96, 97, 98, 99, or 100 wt % based on a total weight of the solid carbon stream 410.

The hydrogen product stream 420 can contain hydrogen in a gas phase. The concentration of hydrogen in the hydrogen product stream 420 can be from about 90 to 100 vol %; alternatively, from about 95 vol % to about 100 vol % based on a total weight of the hydrogen product stream 420; alternatively, 90, 91, 92, 93, 94, 95, 96, 97, 98, 99, or 100 vol % based on a total weight of the hydrogen product stream 420. In some aspects, a portion of the solid carbon that is generated in the methane pyrolysis unit 400 can be carried in hydrogen gas to the gas outlet of the reactor of the methane pyrolysis unit 400. In such aspects, a filter can be placed in the hydrogen product stream 420 to remove solid carbon that is carried in the gas from the reactor of the methane pyrolysis unit 400.

As can be seen in FIG. 2, the hydrogen product stream 420 can flow hydrogen from the methane pyrolysis unit 400 to the furnace 100, to the unit 600, or to both the furnace 100 (e.g., via first portion 420a of the hydrogen product stream 420) and the unit 600 (e.g., via second portion 420b of the hydrogen product stream 420). In some aspects, the hydrogen product stream 420 can connect with the fuel gas stream 140; alternatively, the first portion 420a of the hydrogen product stream 420 can connect with the fuel gas stream 140.

The unit 600 can be the same as described for the unit 600 in FIG. 1, and configured to fluidly couple with and to receive the hydrogen product stream 420, or a portion 420b of the hydrogen product stream 420.

A process performed with system 2000 can include introducing a hydrogen-rich methane stream 210 to a methane pyrolysis unit 400; converting, in the methane pyrolysis unit 400, methane received from hydrogen-rich methane stream 210 to hydrogen and solid carbon; and introducing a first hydrogen product stream 420 comprising the hydrogen into i) the furnace 100 of the hydrocarbon cracking system 1000, ii) a furnace of another hydrocarbon cracking system, iii) a hydrogen fired boiler, iv) a hydrogen sales gas pipeline, v) a storage container, or vi) another process. In aspects where the first hydrogen product stream 420 (or a portion 420a of the hydrogen product stream 420) is introduced to the furnace 100 of the hydrocarbon cracking system 1000, the process can include cracking a hydrocarbon in the hydrocarbon cracking system 1000 to produce a first cracking product stream 132 by combusting the first hydrogen product stream 420 (or a portion 420a of the hydrogen product stream 420) in the furnace 100 of the hydrocarbon cracking system 1000. In aspects, the process can additionally include separating the first cracking product stream 132 into the hydrogen-rich methane stream 210 and a second cracking product stream 220. In aspects, the process can include recovering a solid carbon stream 410 comprising solid carbon from the methane pyrolysis unit 400.

In the process, the hydrocarbon cracking system 2000 can have any of the features and aspects disclosed herein, including but not limited to: i) the furnace 100 can be a hydrogen fired furnace, ii) hydrogen can be present in the first hydrogen product stream 420 in a range from about 50 vol % to about 100 vol % based on a total volume of the first hydrogen product stream 420, or iii) combinations thereof.

ADDITIONAL DESCRIPTION

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the detailed description of the present disclosure. The disclosures of all patents, patent applications, and publications cited herein are hereby incorporated by reference.

Aspects of processes and systems have been described. The following are non-limiting, specific aspects in accordance with the present disclosure:

Aspect 1. A process comprising: introducing a hydrogen-rich methane stream or a methane product stream to a methane pyrolysis unit; converting, in the methane pyrolysis unit, methane received from the hydrogen-rich methane stream or from the methane product stream to hydrogen and solid carbon; and introducing a first hydrogen product stream comprising the hydrogen into i) a furnace of a hydrocarbon cracking system, ii) a hydrogen fired boiler, iii) a hydrogen sales gas pipeline, iv) a storage container, or v) another process.

Aspect 2. The process of Aspect 1, wherein the first hydrogen product stream is introduced to the furnace of the hydrocarbon cracking system, the process further comprising: cracking a hydrocarbon in the hydrocarbon cracking system to produce a first cracking product stream by combusting the first hydrogen product stream in the furnace of the hydrocarbon cracking system.

Aspect 3. The process of Aspect 1 or 2, wherein the furnace of the hydrocarbon cracking system is a hydrogen fired furnace.

Aspect 4. The process of any of Aspects 1 to 3, wherein hydrogen is present in the first hydrogen product stream in a range from about 50 vol % to about 100 vol % based on a total volume of the first hydrogen product stream.

Aspect 5. The process of any of Aspects 1 to 4, wherein the methane product stream is introduced to the methane pyrolysis unit, the process further comprising: separating the hydrogen-rich methane stream into a second hydrogen product stream and the methane product stream.

Aspect 6. The process of Aspect 5, wherein hydrogen is present in the second hydrogen product stream in a range from about 99 vol % to about 100 vol % based on a total volume of the second hydrogen product stream.

Aspect 7. The process of Aspect 5 or 6, further comprising: introducing the second hydrogen product stream into i) the furnace of the hydrocarbon cracking system, ii) the hydrogen fired boiler, iii) the hydrogen sales gas pipeline, iv) the storage container, or v) another process.

Aspect 8. The process of any of Aspects 5 to 7, further comprising: introducing the second hydrogen product stream to the furnace of the hydrocarbon cracking system; separating a first cracking product stream into a second cracking product stream and the hydrogen-rich methane stream; and cracking a hydrocarbon in the hydrocarbon cracking system to produce the first cracking product stream by combusting the second hydrogen product stream in the furnace of the hydrocarbon cracking system.

Aspect 9. The process of any of Aspects 1 to 8, wherein the first hydrogen product stream is introduced to the furnace of the hydrocarbon cracking system, the process further comprising: cracking the hydrocarbon in the hydrocarbon cracking system to produce the first cracking product stream by combusting the first hydrogen product stream in the furnace of the hydrocarbon cracking system.

Aspect 10. The process of any of Aspects 1 to 9, wherein the furnace of the hydrocarbon cracking system is a hydrogen fired furnace.

Aspect 11. The process of any of Aspects 1 to 10, wherein the hydrogen-rich methane stream is introduced to the methane pyrolysis unit, the process further comprising: cracking a hydrocarbon in the hydrocarbon cracking system to produce a first cracking product stream by combusting the first hydrogen product stream in the furnace of the hydrocarbon cracking system.

Aspect 12. The process of Aspect 11, further comprising: separating the first cracking product stream into a second cracking product stream and the hydrogen-rich methane stream.

Aspect 13. The process of Aspect 11 or 12, wherein the furnace of the hydrocarbon cracking system is a hydrogen fired furnace.

Aspect 14. A hydrocarbon cracking system including: a furnace having a conduit contained in an interior of the furnace; a first separator fluidly connected to an outlet of the conduit and configured to separate a first hydrocarbon product stream into a hydrogen-rich hydrocarbon fuel stream and a second hydrocarbon product stream; a second separator fluidly connected to the first separator and configured to separate the hydrogen-rich hydrocarbon fuel stream into a first hydrogen product stream and a methane product stream; and a methane pyrolysis unit having an inlet that is configured to receive the methane product stream, wherein the methane pyrolysis unit is configured to convert methane received from the methane product stream to hydrogen and solid carbon.

Aspect 15. The system of Aspect 14, wherein the first hydrogen product stream is fluidly coupled to an inlet of the furnace.

Aspect 16. The system of Aspect 14 or 15, further comprising: a second hydrogen product stream fluidly coupled to an outlet of the methane pyrolysis unit and to the inlet of the furnace.

Aspect 17. The system of any of Aspects 14 to 16, wherein the furnace is a hydrogen fired furnace.

Aspect 18. A hydrocarbon cracking system including: a furnace having a conduit contained in an interior of the furnace; a first separator fluidly connected to an outlet of the conduit and configured to separate a first hydrocarbon product stream into a hydrogen-rich hydrocarbon fuel stream and a second hydrocarbon product stream; and a methane pyrolysis unit having an inlet that is configured to receive the hydrogen-rich hydrocarbon fuel stream, wherein the methane pyrolysis unit is configured to convert methane received from the hydrogen-rich hydrocarbon fuel stream to hydrogen and solid carbon.

Aspect 19. The system of Aspect 18, further comprising: a hydrogen product stream fluidly coupled to an outlet of the methane pyrolysis unit and to an inlet of the furnace.

Aspect 20. The system of Aspect 18 or 19, wherein the furnace is a hydrogen fired furnace.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A process comprising:
cracking a hydrocarbon in a hydrocarbon cracking system to produce a first cracking product stream;

separating the first cracking product stream into a second cracking product stream and a hydrogen-rich methane stream;

introducing the hydrogen-rich methane stream or a methane product stream to a methane pyrolysis unit;

converting, in the methane pyrolysis unit, methane received from the hydrogen-rich methane stream or from the methane product stream to hydrogen and solid carbon;

flowing hydrogen from the methane pyrolysis unit in a first hydrogen product stream; and introducing at least a portion of the first hydrogen product stream into a furnace of the hydrocarbon cracking system;

wherein the hydrocarbon is cracked in the hydrocarbon cracking system by combusting the at least a portion of the first hydrogen product stream in the furnace of the hydrocarbon cracking system.

2. The process of claim 1, wherein the furnace of the hydrocarbon cracking system is a hydrogen fired furnace.

3. The process of claim 1, wherein hydrogen is present in the first hydrogen product stream in a range from about 50 vol % to about 100 vol % based on a total volume of the first hydrogen product stream.

4. The process of claim 1, wherein the methane product stream is introduced to the methane pyrolysis unit, the process further comprising:

separating the hydrogen-rich methane stream into a second hydrogen product stream and the methane product stream.

5. The process of claim 4, wherein hydrogen is present in the second hydrogen product stream in a range from about 99 vol % to about 100 vol % based on a total volume of the second hydrogen product stream.

6. The process of claim 4, further comprising:

introducing at least a portion of the second hydrogen product stream into i) the furnace of the hydrocarbon cracking system, ii) a hydrogen fired boiler, iii) a hydrogen sales gas pipeline, iv) a storage container, or v) another process.

7. The process of claim 6, wherein the hydrocarbon is cracked in the hydrocarbon cracking system to produce the first cracking product stream by combusting the at least a portion of the second hydrogen product stream in the furnace of the hydrocarbon cracking system.

8. The process of claim 7, wherein the furnace of the hydrocarbon cracking system is a hydrogen fired furnace.

9. The process of claim 1, wherein the hydrogen-rich methane stream is introduced to the methane pyrolysis unit.

10. The process of claim 9, wherein the furnace of the hydrocarbon cracking system is a hydrogen fired furnace.

* * * * *